United States Patent [19]

Starr

[11] 4,336,442

[45] Jun. 22, 1982

[54] COMBINATION RADIATION AND CONVECTION HEATER WITH CONVECTION CURRENT DIRECTING MEANS

[75] Inventor: Eugene W. Starr, Allison Park, Pa.

[73] Assignee: PPG Industries, Inc., Pittsburgh, Pa.

[21] Appl. No.: 224,608

[22] Filed: Jan. 12, 1981

[51] Int. Cl.³ .............................................. F27D 11/02
[52] U.S. Cl. .................................... 219/400; 65/25.2; 219/381; 373/27
[58] Field of Search ............... 219/366, 370, 374, 375, 219/381, 400, 341, 350, 376, 275; 65/25.2, 33, 182 A, 114, 119, 349; 13/2 R, 25; 266/5; 126/21 A

[56] References Cited

U.S. PATENT DOCUMENTS

| | | |
|---|---|---|
| Re. 23,795 | 3/1954 | Cartinhour .......................... 219/381 |
| 1,644,929 | 10/1927 | Ledbetter ................................. 39/16 |
| 3,048,383 | 8/1962 | Champlin ................................ 266/5 |
| 3,223,501 | 12/1965 | Fredlsy et al. ........................ 65/25.2 |
| 3,332,759 | 7/1967 | McMaster et al. ................... 65/25.2 |
| 3,518,351 | 6/1970 | Ohnsorg et al. .......................... 13/25 |
| 3,607,173 | 9/1971 | McMaster et al. ................... 65/25.2 |
| 4,059,426 | 11/1977 | Starr ..................................... 65/25 A |
| 4,059,427 | 11/1977 | Starr et al. ........................... 65/25 A |
| 4,093,816 | 6/1978 | Case ....................................... 13/2 R |
| 4,113,977 | 9/1978 | Hochstrasser et al. ............... 13/2 R |

Primary Examiner—Volodymyr Y. Mayewsky
Attorney, Agent, or Firm—Edward I. Mates

[57] ABSTRACT

A heating system comprising one or more heaters capable of heating by radiation as well as convection incorporating nozzle means extending from an electrically heated gas glow pipe to direct the flow of hot gas providing said convection heating to a region where pressure flow and heat are desired.

11 Claims, 11 Drawing Figures

COMBINATION RADIATION AND CONVECTION HEATER WITH CONVECTION CURRENT DIRECTING MEANS

BACKGROUND OF THE INVENTION

1. Field of the Invention

The present invention relates to heaters that can heat enclosed areas both by radiation and by convection heat. These heaters have many uses. Particularly, such heaters have been used in the heating of glass sheets within a furnace, particularly where it is desired to support glass sheets either partly or entirely on a thin bed of hot gaseous material such as exists in the so-called gas hearth process. Examples of furnaces utilizing the gas hearth process for heating glass sheets may be found in U.S. Pat. No. 3,223,501 to Fredley et al, in U.S. Pat. No. 3,332,759 to McMaster et al, in U.S. Pat. No. 4,059,426 to Starr and in U.S. Pat. No. 4,059,427 to Starr et al. The latter two patents disclose a gas hearth furnace in which an air flow amplifier is used to recirculate gases that are used to heat and support glass sheets conveyed through the gas hearth furnace. The air flow amplifiers of these latter patents employ the Coanda effect to induce entrainment of a greatly amplified volume of recirculating gas flow with a relatively small flow of exterior air into the gas hearth apparatus. The compressed air that is introduced is heated en route to the air amplifier by applying electric voltage to a pipe supplying the air that is heated en route to the air flow amplifier.

The electrically heated tube radiantly supplies heat in U.S. Pat. No. 4,059,427 to radiate downwardly toward the upper surface of the glass sheet supported on a thin gaseous bed and the rate of air flow of the hot gas applied toward the lower surface of the glass sheet is augmented by the introduction of the heated air to entrain the recirculated air through the air flow amplifier of that patent. However, in the event that the introduced gas into the air flow amplifier is not sufficiently hot to raise the temperature of the recirculating gas within the gas hearth to compensate for the loss of temperature resulting from its heating the cool glass sheets that are conveyed through the gas hearth furnace, the application of additional electrical energy into the pipe portion that faces the upper surface of the glass may cause the upper surface of the glass to be heated to a greater amount than the lower surface of the glass. It would be beneficial to the glass heating art to develop an auxiliary heater that could be used to independently control both radiant heat and convective heat where the total heat is provided in a controlled manner to equalize the heat supply to the top and bottom surface of the glass sheets passing through the gas hearth furnace and the convective heat is independently controlled in such a manner as to help support the glass sheets in proper spaced relation above the upper surface of the gas hearth.

DESCRIPTION OF PATENTS OF INTEREST

U.S. Pat. No. Re. 23,795 to Cartinhour relates to an electric air heater having tubular heating elements enclosed in a metallic shell. The tubes are electrically heated while fluid passes through the array of heated tubes within the metallic shell. No row of radially extending nozzles is provided for removal of the heated air in a desired direction to provide convection heating.

U.S. Pat. No. 1,644,929 to Ledbetter relates to an electrically heated garment press that uses the same current to heat electrically heated press jaws and to vaporize water to produce steam. A hollow metal pipe transmits water therethrough. The pipe is heated by electricity so that the water is discharged as steam from an end of the hollow pipe that has an elongated slit in its wall through which the discharged steam flows into a steam chamber that encloses the hollow pipe. No nozzles are provided to direct the flow of steam.

U.S. Pat. No. 3,518,357 to Ohnsorg and Casper discloses an electrical heating element suitable for use in maintaining float glass at a temperature in the range of 1000° to 1500° C. Three conductors, each having a low resistance portion and a high resistance portion, are attached to a common base. Heat generated electrically is radiated and no provision is made for convection heating.

U.S. Pat. No. 4,093,816 to Case discloses hollow tubes of electroconductive metal that radiate heat generated either by electrical energy applied to the tubes or by hot burner gases injected into the tube by a fuel fired burner. There is no provision for convection heating.

U.S. Pat. No. 4,113,977 to Hochstrasser and Ruby discloses a heater for preheating scrap metal by gas recirculation. Hot gases are supplied through U-shaped tubular conduits, each provided with a row of axially aligned openings through which hot gas passes toward the scrap metal to drive volatile constituents such as oil, water and other ingredients from the scrap metal before transferring the scrap metal into a furnace where it is mixed with molten metal. The prior removal of the volatile constituents before mixing with molten metal avoids violent and dangerous eruptions within the furnace. This structure lacks means for directing the volatile constituents in a preferred direction.

SUMMARY OF THE PRESENT INVENTION

The novel combination heating system according to one embodiment of this invention comprises one or more combination radiation and convection heaters in the form of tubular pipe structures of serpentine configuration composed of electroconductive metal. Each pipe comprises an inlet pipe for supplying air or other gas under pressure at one end, a plurality of reversely extending intermediate pipes extending parallel to one another and exposed to a furnace atmosphere, end pipe portions that interconnect ends of adjacent pipes and including an outlet pipe that has a row of axially aligned apertures and outwardly extending nozzles for directing gas jets from said outlet pipe. Electrodes are electrically connected to the end portions of the inlet and outlet pipes so that electric current can be applied to the pipe structure to heat it electrically. Auxiliary gas is supplied under pressure to the pipe inlet and is heated while traversing the inlet, intermediate, end and outlet pipes. The gas is discharged through the nozzles extending from the apertured pipe with sufficient upward force to help support a glass sheet with auxiliary gas support at an elevated temperature determined by the amount of electric heating applied to the pipe structure. One or more pipe structures of this type may be included in a single heater of this type.

In another embodiment, the pipe structure is mounted adjacent a slot opening of a furnace and the nozzles are oriented to apply blasts of hot gas across the inner side of the slot opening to provide a hot gas curtain. Such a curtain prevents cold air blasts from outside the furnace from entering and cooling the furnace. In a specific embodiment, the heaters are located in the lower region of a furnace having a slideable door.

In still another embodiment, one or more pipe structures may be supported in facing relation to the upper surface of a glass sheet with nozzles directed downwardly from an outlet pipe of each pipe structure. These latter pipe structures may be used in combination with the first embodiment of heater described previously.

The present invention will be better understood in the light of a description of several apparatus embodiments that employ the special heaters of the present invention.

BRIEF DESCRIPTION OF THE DRAWINGS

FIGS. 1 and 2 show a portion of a typical tunnel-type furnace for heating glass sheets of the gas hearth type as the glass sheets are conveyed through the furnace. The furnace comprises a pair of refractory side walls 10 and 11, a refractory floor 12 and a refractory roof 13. Within the furnace, a plenum chamber 14 is defined by a pair of longitudinal refractory slabs 15 and 16 and a pair of transverse refractory slabs 17 and 18. A hearth block 20 rests on the upper edges of the slabs to form a roof of the plenum chamber 14 defined by the slabs, 15, 16, 17 and 18. A pair of jacks 19 support the longitudinal refractory slabs 15 and 16 to adjust the orientation and elevation of the hearth block 20 that forms the roof of the plenum chamber. As in conventional with gas hearth furnaces, the furnace floor is supported on I-beams and the furnace roof is suspended from an overhead support structure.

Figure 1:
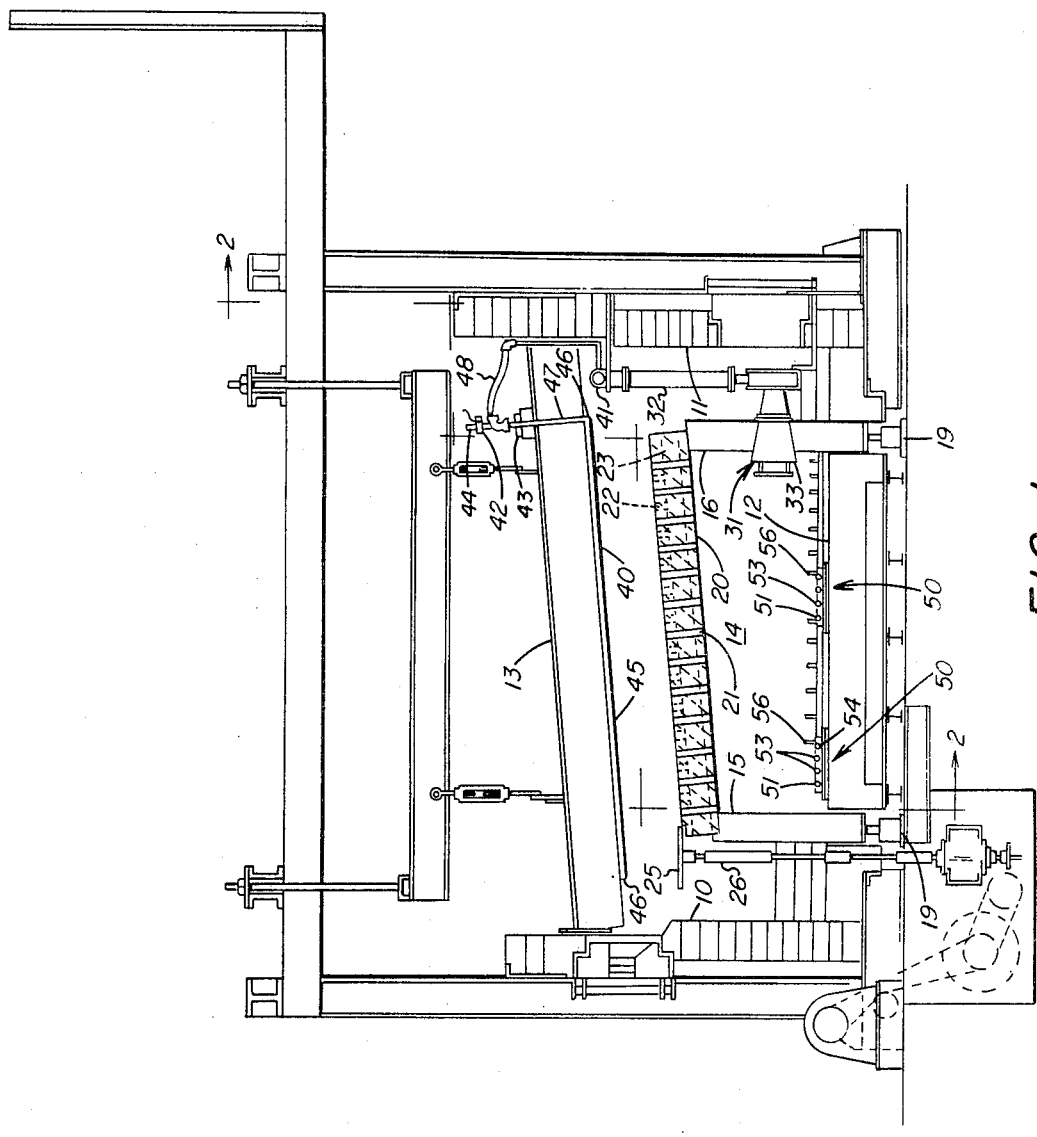
FIG. 1 is a transverse cross-sectional view of a gas hearth type furnace for heating glass sheets that employs a combination radiation and convection heater of the present invention as an auxiliary heater and fluid support provider means.

The hearth block 20 is provided with a large number of supply passages 21 bored through the thickness thereof. In addition, exhaust holes extend part way through the thickness of the hearth block 20 with the lower ends of the exhaust holes 22 communicating with a series of cross-exhaust passages 23. When the plenum 14 is pressurized with heated gas, the gas moves upward through the passages 21 to heat the undersurface of a sheet of glass and to support the glass sheet on a layer of gas. The gas escapes from the space between the upper surface of the hearth block 20 and the bottom surface of the glass sheet through the exhaust passages 22 and returns to the main furnace enclosure through the cross-exhaust passages 23.

The jacks 19 are adjusted individually to tilt the hearth block at a slight angle from the horizontal so that the gas bed thereover is tilted to cause the lower side edge of the glass sheet to rest against a series of driving wheels 25. Each wheel 25 is mounted on a vertical drive shaft 26 which extends out of the furnace. Beyond the furnace the drive shaft is associated with drive means for rotating the shaft and the wheel so that the rotating wheel moves the glass sheet by friction against its lower edge through the furnace. A plurality of wheels 25 rotate in unison to move the glass sheets over the hearth block 20.

Figure 2:
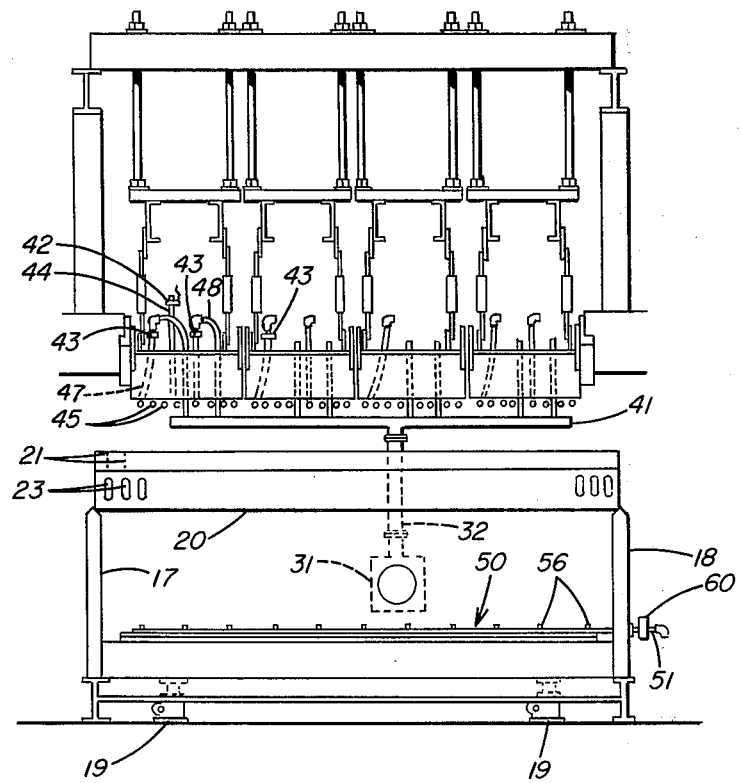
FIG. 2 is a longitudinal sectional view of a zone of said furnace taken along the lines 2—2 of FIG. 1.

The glass sheets are brought into the furnace on rolls (not shown) and, as viewed in FIG. 2, propelled from left to right by the drive wheels 25 across the hearth block 20 into the next furnace zone, if any. Further details of the overall construction and operation of this type of furnace are not necessary for an understanding of this invention. Moreover, such details are well known to those in the art as evidenced by a large number of U.S. patents, such as the aforementioned U.S. Pat. Nos. 3,223,501 and 3,332,759, the disclosures of which are hereby incorporated by reference.

The specific embodiment shown in the drawings employs only electric heating as the source of thermal energy. Thus the gas within the enclosure is air and the terms "air" and "gas" may be used interchangeably in connection with the present invention. But it should be understood that the gas could include combustion products (e.g., from a fuel-burning auxiliary heater) or inert gases as well.

Figure 3:
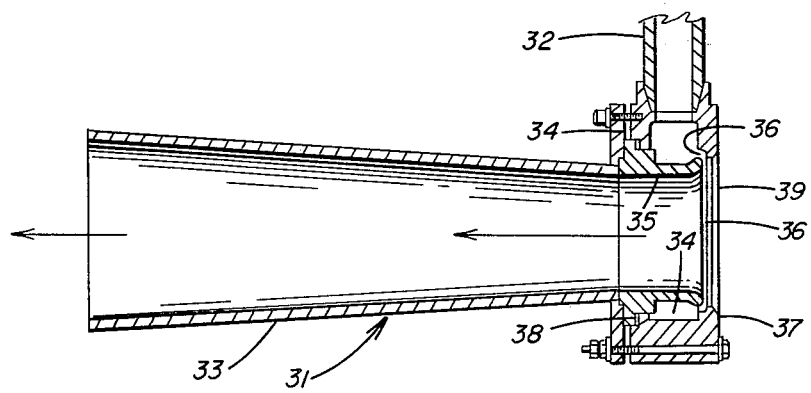
FIG. 3 is an enlarged sectional view of an air flow amplifier along its flow axis.
Figure 4:
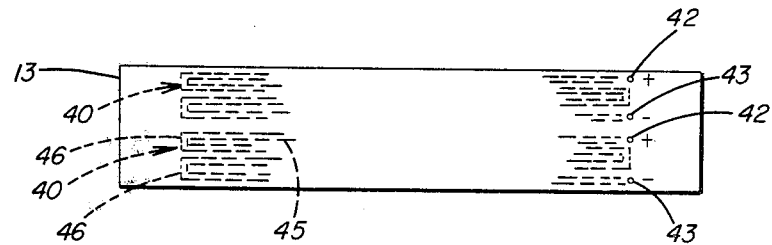
FIG. 4 is a plan view of the roof of a part of said furnace zone.

The first embodiment shown in the drawings uses an air flow amplifier 31 to recirculate the hot gases within the furnace and to pressurize plenum chamber 14. Compressed air is supplied to the air flow amplifier by an inlet pipe 32, and the amplified gas flow is discharged through a flared tube 33. The air flow and the pipe 32 should be made of a material able to withstand high temperatures such as a high temperature-resistant stainless steel. As used herein, the term "air flow amplifier" is intended to mean any device which utilizes the Coanda effect to make a small fluid stream induce a much larger fluid flow. The Coanda effect, a well-known principle of fluid dynamics, is the tendency of a fluid coming out of a jet to closely follow the contour of an adjacent wall rather than follow a straight line. How this is put to use in an air flow amplifier may be illustrated by referring to the cross-sectional view of amplifier 31 shown in FIG. 3. The fluid stream that provides the motivating force, which may be termed the "primary gas" (usually compressed air), flows from inlet pipe 32 into an annular manifold 34 around the outside of a cylindrical throat member 35. The air is then throttled through an annular gap 36 between a curved lip portion of throat 35 and an outer annular manifold housing 37. The width of gap 36 is determined by the thickness of a gasket 38. Air passing through gap 36 attains a very high velocity which, for typical input pressures, may be on the order of sonic velocity. This thin, high velocity, annular stream of air closely follows the curved interior surface of throat 35 in accordance with the Coanda effect, and in so doing, imparts a powerful entrainment force on any gases within the amplifier. As a result, large volumes of gas (the "secondary gas") are drawn into a suction opening 39 and discharged at a high velocity through flared tube 33.

The degree of amplification achieved by such an arrangement is influenced by the pressure of the compressed air input, the width of gap 36, the back-pressure against which the output stream must work, and the design of the particular amplifier used. An airflow amplifier of the type shown in FIG. 3 generally operates effectively at input pressures (measured at the manifold 34) from about 0.5 psig (3500 Pa) to about 60 psig (400,000 Pa) and with a gap width of about 0.003 inch (0.08 millimeters) to about 0.115 inch (3 millimeters). With discharge into free air at room temperature, the amplification ratio of secondary air volume flow rate to primary air volume rate can typically be on the order of 10:1 to 20:1 or even higher. When the amplifier is discharging into a pressurized plenum as shown in FIG. 1, the amplification ratio will be somewhat lower than if it were discharging into free air, but the moderate back-pressure typically encountered in this type of furnace does not preclude a highly efficient and effective amplification. It should also be noted that the amplification ratio may also be decreased with increasing temperature.

Specific dimensions and operating parameters for an air flow amplifier used in this embodiment depend upon the total gas flow requirement for the furnace zone involved, which in turn is largely determined by the particular structural design of the furnace. However, the following illustrative example may be useful as a general guideline. In a conventional glass heating furnace having the general configuration shown in the figures, a plenum pressure of no more than about four ounces per square inch (1700 Pa) is commonly found to be adequate for supporting and heating glass sheets of about ⅛ inch (3 millimeters) to ¼ inch (6 millimeters) in thickness. To maintain such a plenum pressure in one furnace zone 34 inches (86 centimeters) wide and 100 inches (254 centimeters) long, a single air flow amplifier with a 4 inch (10 centimeters) throat diameter may suffice if provided with a compressed air input of about 140 standard cubic feet per minute (4 cubic meters per minute) at a pressure (measured at the manifold 34) of about 5 psi (34,500 Pa) to 20 psi (138,000 Pa). A suitable air flow amplifier is the "Jet-Flo Transducer AGV-100" sold by Union Flonetics Corp., Imperial, Pa.

An example of another, but less advantageous, air entrainment means which may be used in place of air flow amplifier 31 is an inspirator device of the type disclosed in U.S. Pat. No. 3,607,173, disclosure of which is hereby incorporated by reference.

The continual feeding of compressed air into the furnace may cause some pressurization of an enclosure which is particularly airtight, but leakage from most furnaces usually avoids any substantial pressurization. If desired, a vent may be provided through the furnace wall to relieve any excess pressure.

Because the gases directed at the underside of the glass must heat the glass as well as support it, the output from the air flow amplifier should not be cooled by the mixing of unheated compressed air with the cycled furnace gases, and in some cases it is preferred that the temperature of the recycled gases be increased. Accordingly, the specific embodiment shown includes means for heating the compressed air stream to a temperature preferably at least as great as the average furnace temperature. Rather than withdrawing thermal energy from the hot environment of the furnace itself, it has been found to be considerably more efficient to heat the incoming compressed air directly by electrical resistance heating in the compressed air tube itself. Heating takes place in tube sections 40 which are preferably provided with serpentine configurations as shown, extending in an array over the support bed 20, spaced from, but closely adjacent to, the glass sheets carried on the bed. One end of each tube section extends out of the furnace where it communicates with a source of compressed air (not shown), and the other end of each section communicates with a header pipe 41, which in turn feeds the combined heated air flow to the amplifier inlet pipe 32. A plurality of parallel electric circuits for heating the serpentine tube sections 40 is established by clamping electric leads 42 to the portion of each tube section extending outside the furnace and providing a ground by way of a grounding connection 43 connected to the other end of the serpentine tube section.

Each tube section 40 comprises an inlet pipe 44 extending vertically through the furnace roof 13, and connected to parallel interconnected pipes 45 and short interconnecting mitered pipe portions 46 to form the serpentine tube section 40. One exit pipe 47 leads from the end of one of the pipes 45 to a flexible hose 48 of insulating material for connection to the header pipe or manifold 41 and thence through the hot gas delivery tube 32 to the air flow amplifier 31. All the pipes of the serpentine tube sections 40 are of closed wall construction.

A single serpentine tube section may suffice, but a number of shorter sections advantageously provides a large area for heat transfer to the glass without requiring unduly large voltages and without unnecessary overheating of the compressed air. Only a few representative serpentine tube sections are shown in FIG. 2. Not only are considerably larger numbers of serpentine tube sections typical, but also the serpentine tube sections preferably overlie in a continuous array the entire path followed by the glass passing through the furnace. Heat exchange within the serpentine heater tubes can be enhanced with turbulent flow inducing means, such as a twisted stainless steel strap within the tubes.

With the serpentine tube heater arrangement just described, incoming compressed air is quickly and efficiently brought up to furnace temperatures since the limiting factor of heat transfer through a tube wall has been virtually eliminated. Moreover, rather then detracting from the primary thermal energy input to the furnace, the air heating arrangement itself serves as the primary energy source for heating the glass. Thus, a single electric heating means serves the dual function of simultaneously heating both top and bottom sides of the glass with maximimized heat transfer to both. Also, because the electric tube heaters can be located closer to the glass then combustion heaters, a greater portion of the heat generated is usefully transferred to the glass (both by radiation and convection), and the size of the furnace enclosure can be reduced, thereby reducing its energy requirements.

The electrical power requirements are largely dependent on the desired temperature and air flow rates for a particular installation. Furthermore, the power requirements and the number and length of tube heater sections are interdependent and will vary from furnace to furnace. In the example set forth previously, it was found to be convenient to provide ten tube heater sections along a 100 inch (254 centimeters) long furnace zone about six inches (15 centimeters) above the glass. Each section was about 20 feet (6 meters) in length, and was fabricated from ¾ inch (1.9 centimeters) outside diameter tubing of a nickel alloy such as Incoloy 800 or Inconel 600 with 1/16 inch (1.6 millimeters) wall thickness. Adequate heating of both glass and compressed air may be attained with about 5 to 25 kilowatts A.C. applied to each tube section. Such a power level can produce tube temperatures (measured on the outside) ranging from about 1250° F. (675° C.) to about 1650° F. (900° C.) and a plenum temperature a few degrees lower than the tube temperature.

Although the electric tube heater arrangement of the embodiment described above is capable of efficiently providing the furnace with all of its thermal energy requirements, the use of auxiliary heating means (either electric or combustion) is not precluded. Auxiliary heaters may be desirable in particular during startup to aid in quickly bringing the furnace up to the operating temperature.

As an optional arrangement, there may be a plurality of independently controlled tube heater sections across the width of the furnace. That is, each of the tube sections 40 could be further subdivided such that, for example, the power input over the center or either side of the support bed could be independently varied.

Since the serpentine tube sections 40 are located above and in close relation to the glass surface, radiant heat is supplied to the upper surface of the glass and the heating of the gas within the tube sections results in convective heating of the bottom glass surface by supplying hotter gas through the air flow amplifier 31 into the plenum chamber 14. However, in cases where it becomes necessary to provide additional heat, further electrical energy to the serpentine tube sections may result in a temperature gradient, from a higher temperature to the serpentine tube sections 40 facing the upper surface of the glass and a lower temperature to the region facing the lower surface of the glass.

The heater of a first embodiment of the present invention comprises one or more electrically heated serpentine pipe structures 50. Each serpentine pipe structure comprises an inlet pipe 51 that extends through one of the transverse refractory slabs 17 and is connected to an air inlet (not shown) which provides air from outside the furnace. The inlet pipe 51 communicates with a mitered pipe portion 52 that communicates with the first of a plurality of intermediate pipes 53 that are interconnected at opposite ends with additional mitered end pipe portions 52 to form a serpentine passageway for the air or other gas that is delivered to the inlet pipe 51 under pressure. A closed end outlet pipe 54 communicates through the last of the mitered end pipe portions 52 with the last intermediate pipe 53 and is apertured along its length and provided with a plurality of nozzles 56. The latter extend outwardly in a radial direction from the apertures of the apertured outlet pipe 54. The closed end of the apertured outlet pipe 54 is connected to a metal extension 58 which is suitably connected to ground. To provide electrical current to the serpentine pipe structure, a source of potential (not shown) is connected to a positive electrode 60 at the inlet pipe 51 and a ground electrode 62 connects the apertured outlet pipe 54 via metal extension 58 to ground.

Figure 5:
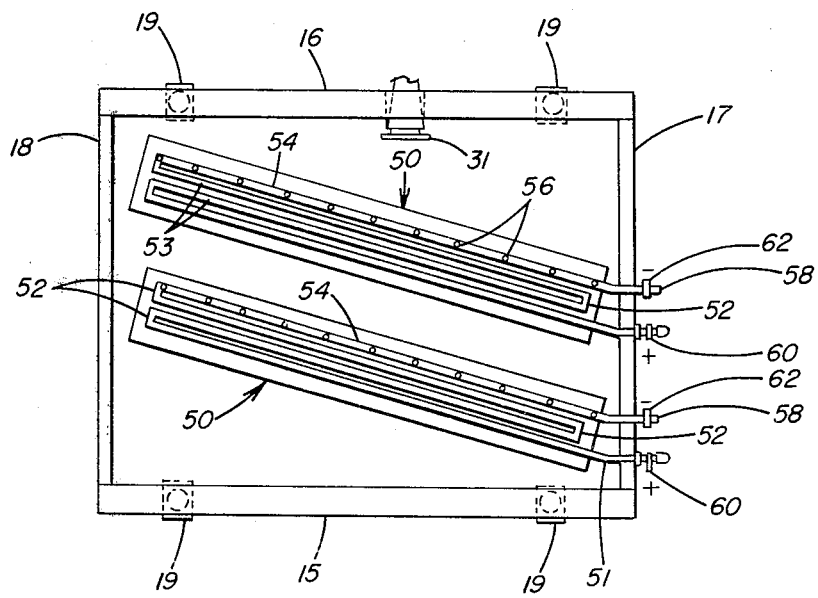
FIG. 5 is a plan view of the floor of a portion of the furnace zone depicted in FIGS. 1 and 2 showing the arrangement of a pair of special heaters conforming to the present invention.

Two serpentine pipe structures 50 are shown in FIG. 5. A typical serpentine pipe section comprises a pipe of Inconel 600 alloy having apertures spaced at uniform axial spacing along the length of the outlet pipe 54. The total length of the tubing determines the resistance of the tube and the amount of heating that is needed. Typical sizes of pipe constructions, pipe and nozzle arrangements and size, and the flow of gas and electric power needed to provide a significant improvement in the utilization of the novel heaters of the present invention will be discussed in the examples that follow later.

The serpentine pipe structures 50 serve as heaters providing both radiant and convection heat and extend diagonally across the lower portion of the furnace at a preferred angle of about 15° to the longitudinal dimension of the plenum chamber 14. The outlet pipe 54 of one structure 50 is in side-by-side relation to the inlet pipe 51 of the other structure 50 so that an array of nozzles 56 provides upward blasts of hot, convection currents toward a desired area extending across the entire width of the path of travel taken by glass sheets.

It is understood that the rate of air flow and the current supplied to the serpentine pipe structure 50 having the apertured pipe outlets 54 can be changed as needed to provide sufficient support for the glass sheets undergoing heating as well as providing sufficient makeup heat to compensate for any difference in heating between the top and bottom surface of the glass sheet as the latter passes over the hearth block above the respective plenum chamber. It is understood that each plenum chamber may be provided with such devices and that such devices may also be provided in the preheat section where glass sheets are supported on cylindrically shaped conveyor rolls with gas supplied upwardly to help reduce the net effect of the downward force of the glass sheets that are conveyed along the conveyor rolls.

Figures 6, 7:
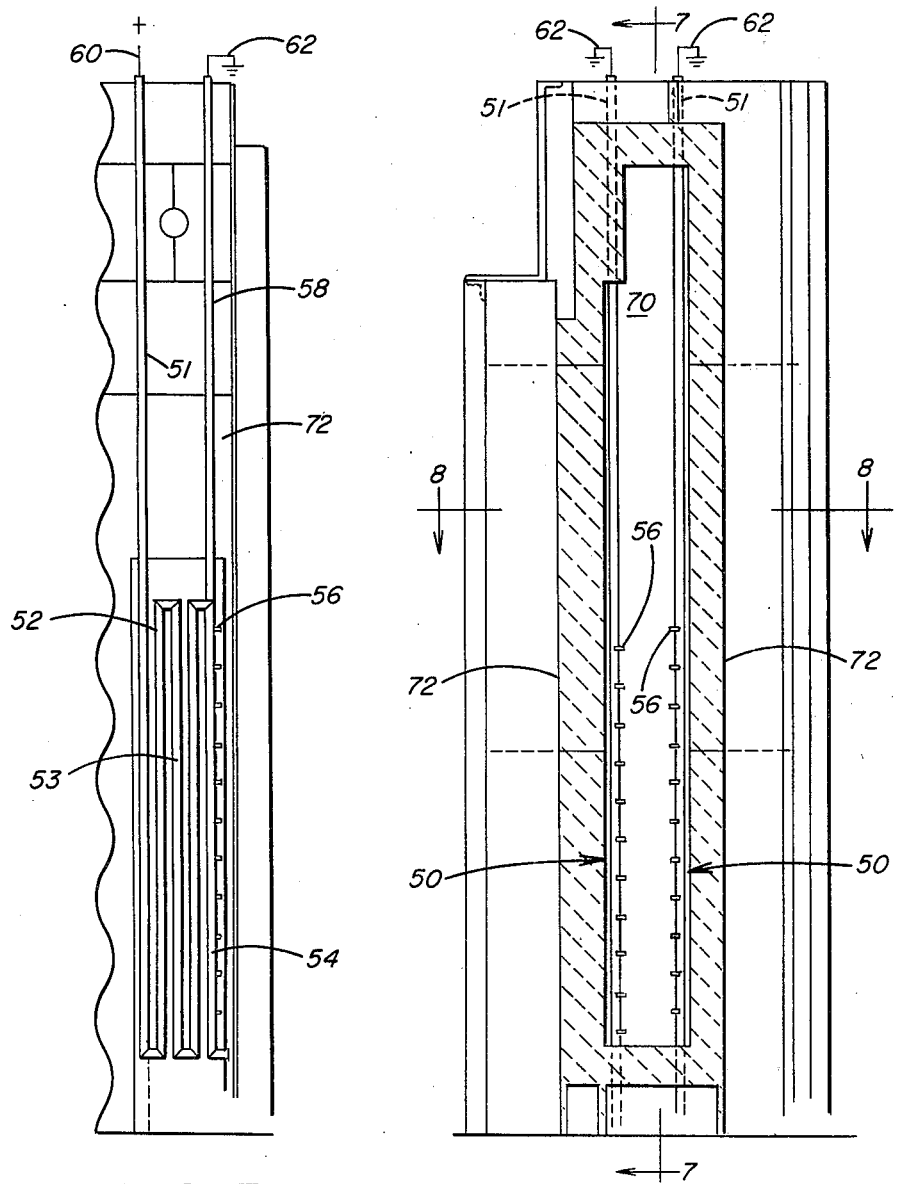
FIG. 6 is a schematic cross-sectional view in elevation of an end of a furnace, showing the relation of a heater relative to a slot opening of said furnace.
FIG. 7 is an elevational view taken along the line 7—7 of FIG. 6.
Figure 8:
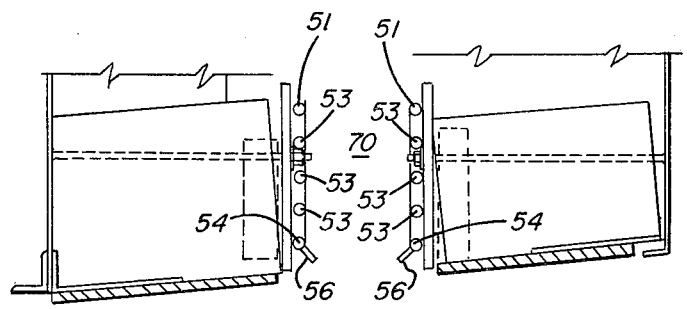
FIG. 8 is a plan view taken along the line 8—8 of FIG. 6.

Referring to FIGS. 6 to 8, a combination heating system comprises an alternate embodiment of this invention that involves the use of two serpentine pipe structures that serve as heaters in close adjacency to an entrance or exit wall of a furnace wherein a vertical slot opening 70 is provided. In FIG. 6, there is shown a pair of serpentine pipe structures 50 (one of which is shown in FIG. 7) mounted with the inlet pipes 51 extending remote from and parallel to a vertical slot opening 70 in a furnace end wall 72 and provided with intermediate pipes 53 and interconnecting mitered pipe portions 52 arranged in serpentine arrangement similar to disclosed in the earlier embodiment. The apertured outlet pipes 54 are arranged parallel to and relatively close to the slot opening 70 with nozzles 56 directed obliquely outward toward the slot opening 70. An extension 58 is provided for each outlet pipe 54. Thus, the heater of this alternative embodiment incorporates means for providing a hot gas curtain adjacent a slot opening 70 of a heating furnace so as to protect the interior of the furnace from random currents of relatively cold fluid from outside the furnace. Electrode 60 is connected to inlet pipe 51 and a ground connection 62 is provided through extension 58 for this embodiment as well as that of FIGS. 1 to 5.

The number of nozzles extending from the outlet pipe should be such that the total inner cross-section of the nozzles 56 should not exceed the inner cross-section of the outlet pipe of the pipe structure from which the nozzles extend. The distance between adjacent nozzles along the outlet pipe should not exceed the distance from the nozzle orifices to the surface of the glass sheet to be heated.

The length of the nozzles extending from the outlet pipe depends on the inner diameter of the nozzle. A minimum length for the nozzle is four times its inner diameter, because it requires at least this length to properly direct blasts of hot gas against the surface to be heated. Since extremely long nozzles provide large resistance to the flow of gases, it is recommended that the maximum nozzle length be no more than ten times its inner diameter.

Figure 9:
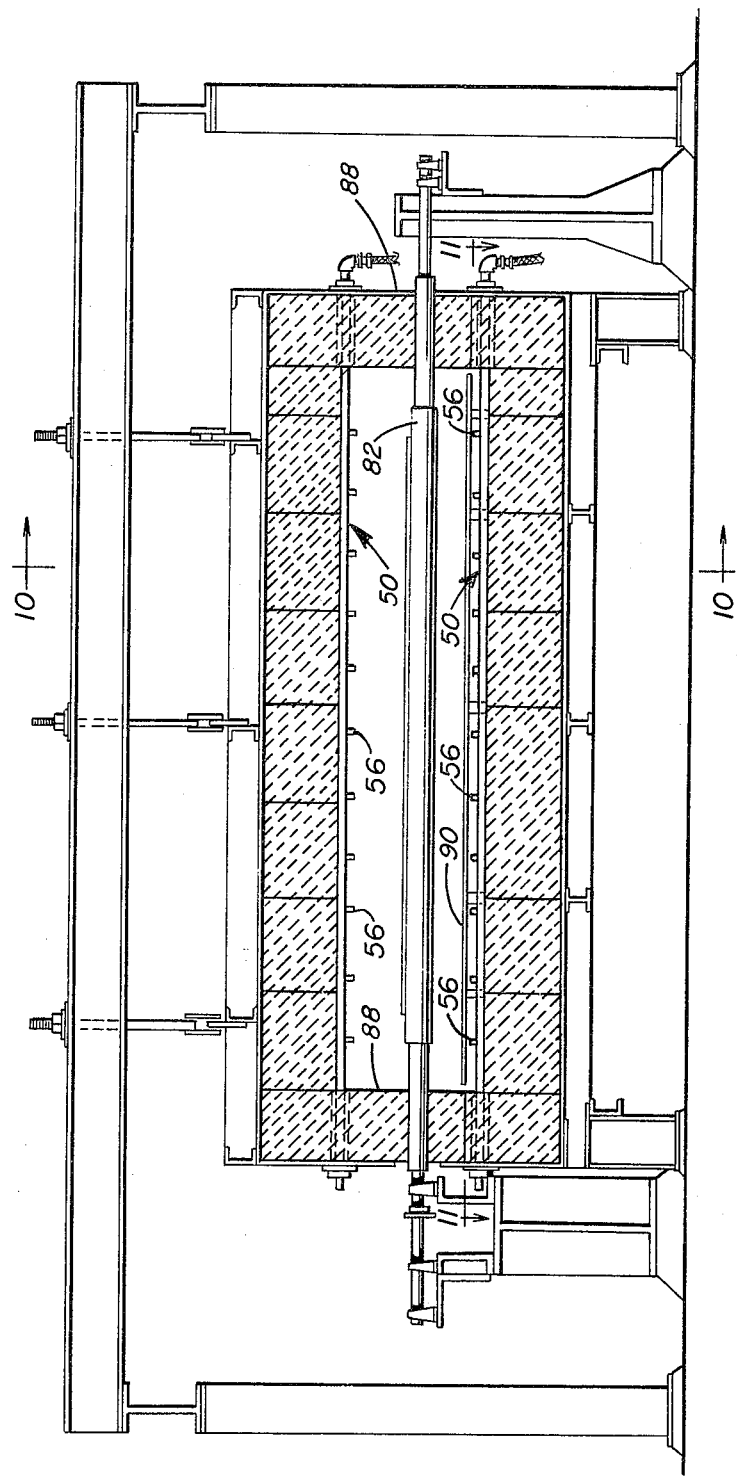
FIG. 9 is a transverse section of still another embodiment of this invention, showing how a heating system conforming to this invention is employed in a section of a roller hearth furnace.
Figure 10:
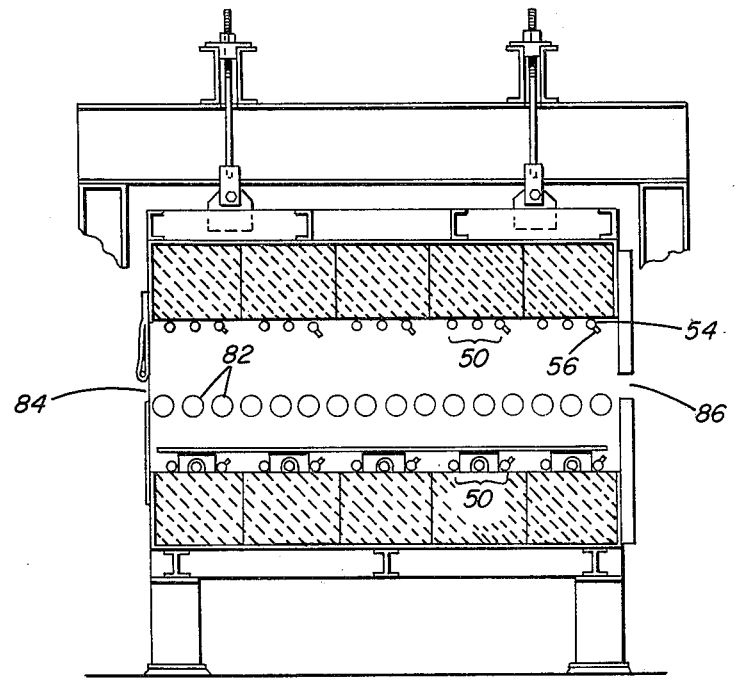
FIG. 10 is a vertical longitudinal section taken along the lines 10—10 of FIG. 9.
Figure 11:
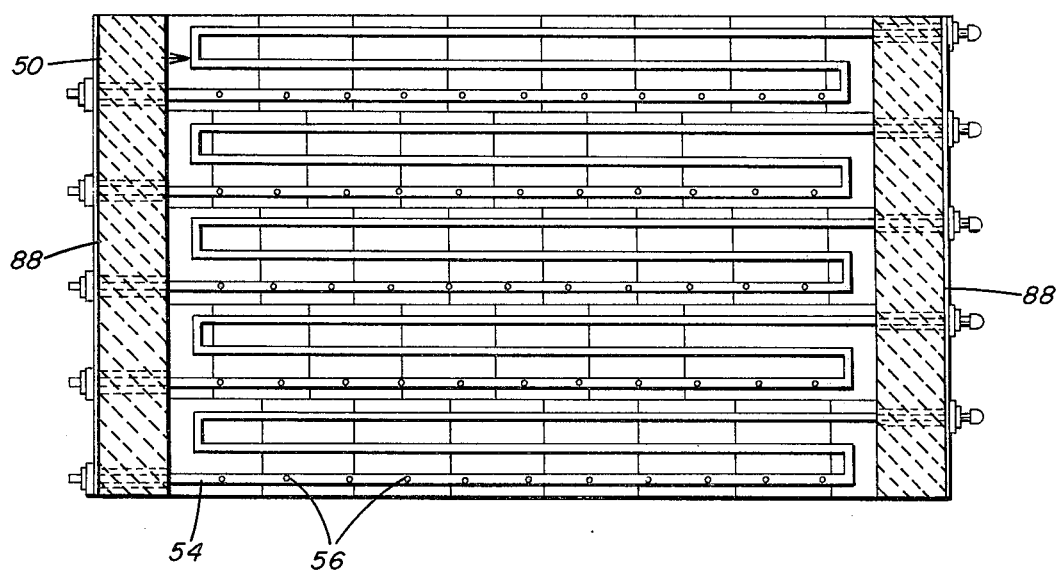
FIG. 11 is a plan view of the arrangement of combination radiation and convection heaters disposed below the conveyor rolls of the roller hearth furnace section of FIG. 9 taken along the line 11—11 of FIG. 9.

FIGS. 9, 10 and 11 depict another embodiment of a combination heating system conforming to this invention for use in a roller hearth furnace section 80. The furnace section comprises a plurality of longitudinally spaced, transversely extending conveyor rolls 82 that form a roller conveyor section that extends from an entrance 84 at the upstream end of the furnace section 80 to an exit 86 at the downstream end of the section. A first plurality of combination radiation and convection heaters 50 similar in structure to those of the previous embodiments are supported between a pair of refractory side walls 88 of the furnace 80 to extend across its transverse dimension with the nozzles 56 extending generally downward from their apertured outlet pipes to direct downwardly directed blasts of hot gas. A second plurality of combination radiation and convection heaters 50 similar in structure to those of the first plurality of heaters are supported near the floor of the furnace section 80 between the side walls 88 below the conveyor rolls 82 and have their nozzles 56 extending in a generally upward direction from their apertured outlet pipes 54 to direct blasts of hot gas generally upwardly toward the bottom major surfaces of glass sheets conveyed through the furnace section 80. A fine mesh screen 90 may be supported in spaced relation over the floor in a manner well known in the art to protect the second plurality of heaters from damage due to contact with glass particles in case glass breakage is experienced. The first and second plurality of heaters cooperate to form another alternate embodiment of heating system conforming to this invention.

EXAMPLE I

In a gas hearth furnace of the type depicted in FIGS. 1 to 5, a pair of heaters conforming to this invention are disposed in a horizontal plane on the furnace floor in side by side relation extending at an oblique angle of 15 degrees to the direction of glass flow through the furnace. Primary heat for this furnace is provided by recirculated hot gas that passes through a plurality of electrically heated tube structures free of apertures that supply gas heated during conveyance through the electrically heated tube to an air flow amplifier via a common manifold for each furnace section.

A furnace section 7 feet (178 centimeters) long has 8 overhead tube structures, each comprising a tube section of Inconel 600 22 to 26 feet (6.7 to 7.9 meters) long composed of connecting tube sections and an inlet tube having an outer diameter of 1 inch (2.5 centimeters), an inner diameter of ⅞ inch (2.2 centimeters) extending across the roof of the furnace 6 feet (181 centimeters) in length, and 3 additional tube sections of the same dimensions extending parallel to one another and interconnected at alternate ends by mitered end tube sections 2 inch (5 centimeters) long to separate the parallel tube sections by one inch (2.5 centimeters). The tubes are supported 7 inches (18 centimeters) to 12 inches (30 centimeters) above the upper surface of glass sheets conveyed through the furnace and are oriented to extend transverse to the path of glass sheet travel. Air is supplied to each top heater at a rate of 9.2 scfm (0.28 standard cubic meters per minute) through tubes heated by A.C. voltage of 24 volts supplying 400 amperes or 9.6 kilowatts power. The total primary heat supplied in the 7 foot long section of furnace is 76.8 kilowatts.

Below the hearth bed at a distance below the glass sheet support plane averaging about 2 feet (61 centimeters) is a pair of special heaters of the present invention, each extending 15 degrees oblique to the glass sheet movement path and supported horizontally on a rectangular refractory support resting on the furnace floor. Each refractory support is 6½ feet (2 meters) long and 1 foot (0.3 meters) wide and separated by about 7 inches (18 centimeters) in a direction transverse to its length from the other refractory support. The pipe arrangement of the auxiliary bottom heaters is similar to that of the serpentine tube arrangement of the top heaters except for an apertured outlet pipe at the end of the serpentine pipe structure. The outlet pipe of each bottom heater has 11 equally spaced apertures at 7.2 inches (18 centimeters) centers. A nozzle having an outer diameter of ⅜ inch (0.9 centimeters), an inner diameter of ¼ inch (0.6 centimeters) and a length of 1.5 inches (3.8 centimeters) extends upward from each outlet pipe toward the lower surface of the glass sheet.

It is understood that both the electrical heat and the rate of air flow may be modified to provide radiant and convection heat at various temperatures. For the auxiliary heater described in Example I, the following combinations of air pressure, volume of air flow and kilowatts of energy supplied provided the following temperatures for the exterior wall of the pipe structure and air temperatures for the bottom heaters.

| Air Pressure (PSI) | Air Flow (SCFM) | Kilowatts Per Heater | Pipe Temp. (°F.) | Air Temp. (°F.) |
|---|---|---|---|---|
| 2.5 | 3.4 | 3.8 | 1300 | 1345 |
| 5.0 | 4.7 | 3.9 | 1302 | 1345 |
| 10.0 | 6.4 | 4.5 | 1300 | 1335 |
| 20.0 | 9.3 | 6.6 | 1300 | 1300 |
| 20.0 | 9.3 | 7.5 | 1400 | 1410 |
| 10.0 | 6.4 | 5.7 | 1395 | 1430 |
| 5.0 | 4.5 | 5.1 | 1405 | 1450 |
| 2.5 | 3.2 | 4.1 | 1400 | 1425 |
| 2.5 | 3.0 | 4.8 | 1500 | 1555 |
| 5.0 | 4.6 | 5.4 | 1500 | 1545 |
| 10.0 | 6.4 | 6.4 | 1500 | 1545 |
| 20.0 | 9.3 | 8.5 | 1505 | 1525 |

The pipe temperatures measured indicate the energy level of the radiant heat source that was obtained, while the air temperatures measured indicate the energy level of the convection heat source. The table also indicates that when a higher air flow rate is used to help support the glass or convectively heat the glass, a greater amount of electrical energy is needed to maintain a given radiant energy level for the system. If desired, the bottom heaters may be used as radiant heaters exclusively if so desired, by refraining from supplying air to the tube structure.

EXAMPLE II

Adjacent a vertical slot opening to a furnace of the type depicted in FIGS. 6 to 8, a pair of heaters conforming to this invention is installed so that a plane occupied by the exit orifices of nozzles attached to each outlet pipe is approximately 8 inches (20 centimeters) from the corresponding plane of the other heater. Each heater comprises a pipe construction having a length of 22 to 26 feet (6.7 to 7.9 meters including its extension portions connected to an electrode and ground outside the furnace) to cover an effective heating area approximately 48 inches (122 centimeters) long and approximately 8 inches (20 centimeters) wide with 5 lengths of pipe spaced one inch (2.5 centimeters) apart along their length arranged in serpentine fashion. The pipes include an inlet pipe 102 inches (259 centimeters) long, 3 intermediate pipes, each 48 inches (122 centimeters) long and an outlet pipe 48 inches (122 centimeters) long with four short mitered interconnecting pipe sections 1.75 inches (4.4 centimeters) long at their center lines. The pipes have an inner diameter of $\frac{5}{8}$ inch (1.6 centimeters), an outer diameter of $\frac{3}{4}$ inch (1.9 centimeters) and the outlet pipe has apertures aligned axially along its length. The apertures are 4 inches apart and each have a diameter of $\frac{1}{4}$ inch (9.6 centimeters) to receive a nozzle $\frac{7}{8}$ inch (2.2 centimeters) long having an inner diameter of 0.152 inch (0.4 centimeter). Air is supplied at approximately 7.3 scfm (0.22 standard cubic meters per minute) at room temperature to the inlet tube and the heater is heated with 7.2 kilowatts of electrical energy obtained by applying 24 volts 60 cycle A.C. which produces 300 amperes of current. The nozzles extending from one heater are staggered in vertical position relative to the corresponding nozzles of the other heater. The heaters have their serpentine portions disposed to face the lower portion of the vertical slit opening in the furnace. When a sliding furnace door (not shown) is opened only for the entry and removal of a glass sheet, it is sufficient to have the nozzles inpart the hot air curtain in the lower portion only of the slot opening 70.

EXAMPLE III

To demonstrate the efficiency of nozzles in the outlet pipe of a serpentine pipe construction heater, square sheets of glass having a nominal thickness of $\frac{1}{8}$ inch (3.2 millimeters) were heated by serpentine pipe construction heaters having an apertured outlet pipe. One of the heaters had nozzles extending from the apertures, the other had apertures with no nozzles. It took 133 seconds to heat a square glass sheet from room temperature to 1200° F. using 7.5 kilowatts and supplying air at 7.0 scfm (0.21 standard cubic meters per minute) for a heater without nozzles. It took only 88 seconds to heat a square glass sheet of the same nominal thickness to 1200° F. using only 6.5 kilowatts and supplying air at 7.2 scfm (0.23 standard cubic meters per minute).

The results of this test indicated that the incorporation of nozzles improved the overall efficiency of the novel heaters of this invention compared to those omitting nozzles.

EXAMPLE IV

Another embodiment of the present invention recirculates hot air for a gas hearth type furnace without using an air amplifier. In a furnace section 7 feet (213 centimeters) long capable of handling glass sheets 5 feet (152 centimeters) wide, 8 overhead heaters of serpentine construction 22 feet to 26 feet (6.7 to 7.2 meters) long are suspended from the furnace roof above a gas hearth block and two additional bottom heaters of serpentine construction of the same length are supported below the gas hearth block. The amount of electrical energy and the pressure of hot gas recirculation through the gas hearth bed are controlled independently based on the thickness of glass sheets being heated. For example, in handling glass sheets 5 milimeters thick, 119 kilowatts was supplied electrically to the 10 heaters (each comprising a pipe structure 22 to 26 feet (6.7 to 7.9 meters) long with substantially equal electrical heat per pipe heater and a recirculating hot gas pressure of 11.7 centimeters of water column was applied to the plenum chamber of the gas hearth block. When the same apparatus heated glass sheets 3 milimeters thick, the 10 heaters were heated electrically with a total of 103 kilowatts of electrical energy applied substantially equally among the heaters and a recirculating plenum pressure of 10.2 centimeters of water column was applied to the plenum chamber of the gas hearth block.

EXAMPLE V

In still another embodiment of the present invention which omits the use of the air amplifier of the FIGS. 1 to 5 embodiment, a roller hearth furnace section of the type depicted in FIGS. 9, 10 and 11 is provided with 5 radiation and convection heaters having the serpentine pipe structure 50 similar to those of the lower auxiliary heaters of the first embodiment with the serpentine pipe structures 50 disposed below the rollers of the furnace/conveyor supported from the furnace floor and having nozzles 56 extending upward from their outlet pipes 54 while 5 additional serpentine pipe structures 50 are disposed above the furnace conveyor rollers and have their nozzles 56 extend downward from their outlet pipes 54 in opposition to the first nozzles. The amount of electrical energy applied to the upper heaters and the rate of air flow to the upper pipe structures to provide a desired heat intensity is substantially balanced by the heat intensity provided by a different combination of electrical energy and air flow to the heaters disposed below the conveyor to develop a desired pipe temperature for the upper heaters equivalent to the pipe temperature developed for the lower heaters opposite thereto.

Different combinations of electrical input and hot air flow are reported in Example I to develop equal pipe temperatures for the upper and lower heaters. The equal pipe temperatures developed with different rates of hot gas flow and different electrical energy inputs to top and bottom opposing heaters still results in balanced heat inputs toward the opposite glass sheet surfaces. At the hot end of the roller hearth furnace where the glass sheets are most susceptible to heat softening, the upward air flows from the bottom heaters are stronger than the downward air flows from the upper heaters to provide an upward lifting force less than the weight of the glass sheets so that the apparent mass of the glass on the conveyor rolls is reduced by an amount sufficient to reduce roll ripple distortion yet insufficient to avoid glass to roll friction entirely. At the cold end of the roller hearth furnace where the glass sheets are too hard to develop roll ripple distortion, it may be desirable to reverse the relative strength of the air flows through the nozzles of the upper and lower heaters to minimize the possibility of glass sheet slippage relative to the rotating rolls of the roller hearth. The electrical energy input would be adjusted between the upper and lower opposing heaters to insure that the combination of electrical heating and hot air flow heating develops an elevated temperature for the upper heaters that substantially equals that developed for the lower heaters. Since the total heat supplied to the opposite glass surface is equal, glass sheet distortion is not likely.

Use of the Present Heaters With Coating Apparatus

The heaters of the present invention are also suitable for use in furnaces that have one or more pressurized sections adjacent a coating station that uses the heaters of the present invention to pressurize the conveyor section adjacent a coating station to avoid escape of unwanted spray or other coating composition into the pressurized conveyor section. The latter may be a section of a furnace that contains either a gas hearth or a roller conveyor for conveying glass sheets therethrough for heating the sheets to a temperature suitable for coating.

The form of the invention shown and described in this disclosure represents certain illustrative preferred embodiments shown under certain different environments. It is understood that various changes may be made such as in the specific operation of the special heaters of the present invention without departing from the gist of the invention as defined in the claimed subject matter which follows.

I claim:

1. A heating system comprising a combination radiation and convection heater comprising a serpentine pipe structure of electroconductive metal comprising an inlet pipe, a plurality of intermediate pipes communicating with said inlet pipe and one another in end to end relation, and a closed end outlet pipe communicating with the last of said intermediate pipes, said pipes being arranged transversely spaced from one another and extending parallel to one another in serpentine relation to occupy an area, means to apply electrical energy to said pipe structure to heat said pipe structure to a temperature at which it radiates heat into a desired area within the adjacent environment, means to apply gas under pressure to said inlet pipe for conveyance through said intermediate pipes and said outlet pipe when said pipe structure is electrically heated, said outlet pipe having a plurality of axially aligned, longitudinally spaced openings for discharge of said gas to said desired area within said adjacent environment, further including means to direct said discharged gas in a desired direction toward said desired area, said means comprising nozzles extending in an outward direction from said axially aligned openings toward said desired area in the direction desired for convection heating.

2. A heating system comprising the combination radiation and convection heater as in claim 1, in combination with at least one other like radiation and convection heater disposed in side by side relation thereto with the inlet pipe of one of said heaters adjacent the outlet pipe of the heater in side by side relation thereto, whereby said nozzles provide flows of convection heating across the width of said desired area.

3. A combination heating system comprising the heating system as in claim 1, in combination with at least one other like radiation and convection heating system provided with at least one combination radiation and convection heater having nozzles constructed and arranged to provide flows of convection heating having a component of motion in the opposite direction to said flows from said first named nozzles.

4. A heating system as in claim 1 for use in the vicinity of a slot opening in a furnace, comprising a pair of said heaters, one of which is located on one side of said slot opening and whose outlet pipe extends parallel to said slot opening and whose nozzles extend transversely of said slot opening toward said slot opening, and the other of which is located on the other side of said slot opening and whose outlet pipe extends parallel to said slot opening and whose nozzles extend transversely of said slot opening toward said slot opening to cooperate to form a gas curtain at said slot opening.

5. A heating system as in claim 4, wherein said slot opening extends vertically and said heaters extend along the lower portion only of said slot opening.

6. A heating system as in claim 1 or claim 2, wherein the total inner cross-sectional area of said nozzles does not exceed the cross-sectional area of said outlet pipe from which said nozzles extend and the length of each said nozzles is 4 to 10 times its inner diameter.

7. A combination heating system comprising the heating system as in claim 1, comprising a first plurality of combination radiation and convection heaters, each of said heaters comprising a serpentine pipe structure of electroconductive metal comprising an inlet pipe, a plurality of intermediate pipes communicating with said inlet pipe and one another in end to end relation, and a closed end outlet pipe communicating with the last of said intermediate pipes, said pipes being arranged transversely spaced from one another and extending parallel to one another in serpentine relation to occupy an area, means to apply electrical energy to said pipe structure to heat said pipe structure to a temperature at which it radiates heat into a desired area within the adjacent environment, means to apply gas under pressure to said inlet pipe for conveyance through said intermediate pipes and said outlet pipe when said pipe structure is electrically heated, said outlet pipe having a plurality of axially aligned, longitudinally spaced openings for discharge of said gas to said desired area within said adjacent environment, further including means to direct said discharged gas in a desired direction toward said desired area, said means comprising nozzles extending in an outward direction from said axially aligned openings toward said desired area in the direction desired for convection heating disposed to one side of a path of glass sheet travel, a second plurality of combination radiation and convection heaters, each of said heaters comprising a serpentine pipe structure of electroconductive metal comprising an inlet pipe, a plurality of intermediate pipes communicating with said inlet pipe and one another in end to end relation, and a closed end outlet pipe comunicating with the last of said intermediate pipes, said pipes being arranged transversely spaced from one another and extending parallel to one another in serpentine ralation to occupy an area, means to apply electrical energy to said pipe structure to heat said pipe structure to a temperature at which it radiates heat into a desired area within the adjacent environment, means to apply gas under pressure to said inlet pipe for conveyance through said intermediate pipes and said outlet pipe when said pipe structure is electrically heated, said outlet pipe having a plurality of axially aligned, longitudinally spaced openings for discharge of said gas to said desired area within said adjacent environment, further including means to direct said discharged gas in a desired direction toward said desired area, said means comprising nozzles extending in an outward direction from said axially aligned openings toward said desired area in the direction desired for convection heating disposed to the other side of said path, certain heaters of said first plurality opposing certain heaters of said second plurality, means for delivering gas at different rates of flow to said certain opposing heaters and means for supplying electrical energy at different energy levels to said certain opposing heaters to develop a total heat delivery for said certain opposing heaters that approximates equal total heat delivery.

8. A heating system as in claim 7, for use with a roller hearth furnace provided with a horizontal roller conveyor, said furnace having an upstream end and a downstream end, wherein the opposing heaters at the upstream end comprise upper heaters having downwardly directed nozzles located above said conveyor constructed and arranged to deliver stronger blasts of hot gas through their downwardly directed nozzles than opposing lower heaters having upwardly directed nozzles located below said conveyor deliver through their upwardly directed nozzles.

9. A heating system as in claim 8, wherein the opposing heaters at the downstream end comprise upper heaters located above said conveyor constructed and arranged to deliver weaker blasts of hot gas through their downwardly directed nozzles than opposing lower heaters located below said conveyor deliver through their upwardly directed nozzles.

10. A heating system comprising a plurality of combination radiation and convection heaters, each of said heaters comprising a serpentine pipe structure of electroconductive metal comprising an inlet pipe, a plurality of intermediate pipes communicating with said inlet pipe and one another in end to end relation, and a closed end outlet pipe communicating with the last of said intermediate pipes, said pipes being arranged transversely spaced from one another and extending parallel to one another in serpentine relation to occupy an area, means to apply electrical energy to said pipe structure to heat said pipe structure to a temperature at which it radiates heat into a desired area within the adjacent environment, means to apply gas under pressure to said inlet pipe for conveyance through said intermediate pipes and said outlet pipe when said pipe structure is electrically heated, said outlet pipe having a plurality of axially aligned, longitudinally spaced openings for discharge of said gas to said desired area within said adjacent environment, further including means to direct said discharged gas in a desired direction toward said desired area, said means comprising nozzles extending in an outward direction from said axially aligned openings toward said desired area in the direction desired for convection heating for use in a gas support furnace for heating glass sheets comprising a hearth block having gas supply openings extending through its thickness for supplying gas to the upper surface of said hearth block to provide a gas bed for supporting glass sheets thereover, and heating means facing the upper surface of said supported glass sheets, wherein each said combination radiation and convection heater is supported below said hearth block in such an arrangement that said nozzles extend in the general direction of the thickness of said hearth block to supply heated gas under pressure through said gas supply openings extending through said hearth block.

11. A heating system for use in a roller hearth furnace comprising a roller conveyor, a plurality of combination radiation and convection heaters, each of said heaters of said plurality comprising a serpentine pipe structure of electroconductive metal comprising an inlet pipe, a plurality of intermediate pipes communicating with said inlet pipe and one another in end to end relation, and a closed end outlet pipe communicating with the last of said intermediate pipes, said pipes being arranged transversely sapced from one another and extending parallel to one another in serpentine relation to occupy an area, means to apply electrical energy to said pipe structure to heat said pipe structure to a temperature at which it radiates heat into a desired area within the adjacent environment, means to apply gas under pressure to said inlet pipe for conveyance through said intermediate pipes and said outlet pipe when said pipe structure is electrically heated, said outlet pipe having a plurality of axially aligned, longitudinally spaced openings for discharge of said gas to said desired area within said adjacent environment, further including means to direct said discharged gas in a desired direction toward said desired area, said means comprising nozzles extending in an outward direction from said axially aligned openings toward said desired area in the direction desired for convection heating, said plurality being disposed below said conveyor with said nozzles being upwardly directed to face said lower surface of said glass sheet supported on said roller conveyor and a second plurality of said combination radiation and convection heaters, each of said heaters of said second plurality comprising a serpentine pipe structure of electroconductive metal comprising an inlet pipe, a plurality of intermediate pipes communicating with said inlet pipe and one another in end to end relation, and a closed end outlet pipe communicating with the last of said intermediate pipes, said pipes being arranged transversely spaced from one another and extending parallel to one another in serpentine relation to occupy an area, means to apply electrical energy to said pipe structure to heat said pipe structure to a temperature at which it radiates heat into a desired area within the adjacent environment, means to apply gas under pressure to said inlet pipe for conveyance through said intermediate pipes and said outlet pipe when said pipe structure is electrically heated, said outlet pipe having a plurality of axially aligned, longitudinally spaced openings for discharge of said gas to said desired area within said adjacent environment, further including means to direct said discharged gas in a desired direction toward said desired area, said means comprising downwardly extending nozzles extending in an outward direction from said axially aligned openings toward said desired area in the direction desired for convection heating from positions above said conveyor.

\* \* \* \* \*

UNITED STATES PATENT AND TRADEMARK OFFICE
CERTIFICATE OF CORRECTION

PATENT NO. : 4,336,442
DATED : June 22, 1982
INVENTOR(S) : Eugene W. Starr

It is certified that error appears in the above-identified patent and that said Letters Patent are hereby corrected as shown below:

In the Abstract, line 4, change "glow" to --flow--.

In Claim 7, line 52, Column 14, change "ralation" to --relation--.

In Claim 11, line 12, Column 16, change "sapced" to --spaced--.

Signed and Sealed this

Fourteenth Day of September 1982

[SEAL]

Attest:

GERALD J. MOSSINGHOFF

*Attesting Officer*   *Commissioner of Patents and Trademarks*